INVENTOR.
KENNETH A. BROWNE.
BY
ATTORNEY

INVENTOR.
KENNETH A. BROWNE.
BY
ATTORNEY

Patented Aug. 15, 1950

2,518,660

UNITED STATES PATENT OFFICE 2,518,660

INTERNAL-COMBUSTION ENGINE AND
EXHAUST GAS TURBINE THEREFOR

Kenneth A. Browne, Ridgewood, N. J., assignor to Wright Aeronautical Corporation, a corporation of New York Application September 7, 1944, Serial No. 553,092

7 Claims. (Cl. 60—13)

1

This invention relates to internal combustion engines, and is particularly directed to means for recovering power from the engine exhaust gases.

It is well known that a considerable portion of the power available in the combustion gases of an internal combustion engine is wasted through its exhaust gases. In the past, the energy in the exhaust gases of an internal combustion engine has been utilized in various ways, for example, by means of a turbo-supercharger. However, in a turbo-supercharger, the supercharger output is conventionally controlled by a waste gate controlling the engine exhaust gases delivered to or by-passed around the turbine, and in this way, maintaining a substantially constant engine exhaust back pressure. However, because of this back pressure, at least a portion of the energy available in the exhaust gases recovered by the turbo-supercharger is at the expense of engine efficiency. This is particularly true of high altitude operation of aircraft engines. Accordingly, it is an object of this invention to utilize the energy in the engine exhaust gases without adding appreciably to the engine exhaust back pressure.

It is a further object of this invention to use the energy available in the engine exhaust gases for driving a turbine driven fan supplying engine cooling air. The invention further comprises a novel disposition and construction of the turbine-driven fan in an aircraft engine installation. Thus the turbine is coaxially disposed between the engine and propeller driven thereby and the fan is formed integral with the turbine wheel, the fan blades in effect comprising spokes for the turbine wheel. Furthermore, the turbine comprises the novel construction wherein the turbine blades are cast in groups, each group having an inwardly extending supporting arm and being circumferentially expandable relative to the adjacent turbine blade groups. With this construction there are no tangential stresses at the rim of the turbine wheel as a result of thermal expansion of the wheel rim.

It is also an object of this invention to utilize some of the power in the engine exhaust gases by drivably connecting the turbine wheel and/or the aforementioned turbo-fan combination to the engine crank shaft. The turbo-fan may be geared directly to the crank shaft through a fixed speed-ratio transmission. However, since an aircraft engine may have approximately a two to one speed range between full power and minimum cruising operation, the turbo-fan would have a

2 similar two to one speed range between full power and cruising operation if a fixed speed ratio were provided between the turbine and engine. Also, since the power required by a fan is substantially proportional to the cube of its speed, a two to one fan-speed range would provide an eight to one range in the fan power requirements. This is much too large in view of the cooling requirements of the engine, and accordingly, it is an object of this invention to provide a multi-speed ratio transmission between the turbo-fan and engine. It is a further object of this invention to provide means for automatically shifting said transmission to reduce the turbo-fan to crank shaft speed ratio with increase in engine speed. With such a construction the engine speed may be varied without requiring a corresponding change in the speed of the turbo-fan. A two-speed transmission has been provided and in order to prevent hunting of the transmission between its two speed ratios, novel control means are provided whereby there is a substantial speed differential between a speed ratio shift in one direction and the return shift. As the engine speed and power increase, the rate of discharge of the engine exhaust gases also increases, and therefore, it is a further object of this invention to increase the nozzle discharge area of the turbine nozzle box with increase of engine speed, in order to efficiently use the power available in the engine exhaust gases. In addition, it is a further object of this invention to use the means for shifting the turbo-fan to crank shaft speed ratio for also adjusting the turbine nozzle box to increase the nozzle discharge area with increase in engine speed.

Instead of or in addition to drivably connecting the turbo-fan to the engine crank shaft, the turbo-fan may be used to provide an air jet propulsive thrust and/or to drive various engine auxiliaries as illustrated in other embodiments of applicant's invention. For example, the turbo-fan may be drivably connected to a supercharger supplying compressed air to the engine induction system. The power available for driving the supercharger may be controlled by varying the engine-cooling-air power demand on the turbo-fan and in addition or in lieu thereof, the supercharger may be controlled by controllably wasting its output air. As a further modification, the turbine driven supercharger is arranged to over-compress the air, and after passing through an intercooler, the compressed air expands through a so-called "Francis" or reaction type turbine, drivably connected to the engine, from which the air is distributed to the engine cylinders. The turbo-fan may also be utilized for driving various engine auxiliaries, e. g., an A. C. alternator, at constant speed. It is a further object of this invention to provide means to automatically vary the engine-cooling-air power demand on a turbo-fan in order to so control the total power demand on the turbo-fan that it operates at a substantially constant speed and therefore drives the engine auxiliary connected thereto at a constant speed.

Other objects of this invention will become apparent upon reading the annexed detailed description in connection with the drawing in which.

Figure 1:
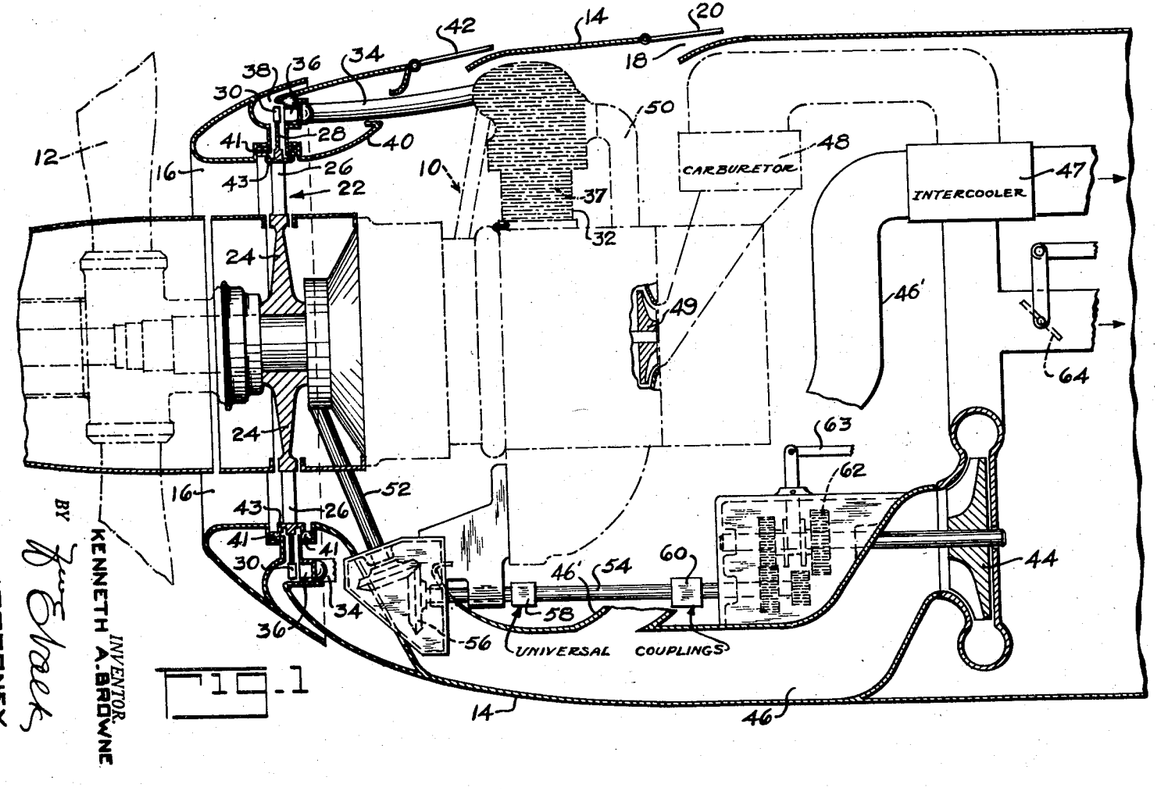
Figure 1 is a schematic view partly in section of an internal combustion engine embodying one form of the invention for using the power available in the engine exhaust gases.

Referring first to Figure 1, an aircraft engine installation is illustrated comprising a conventional radial cylinder air cooled internal combustion engine 10 which is drivably connected to a propeller 12 and is disposed within a cowl 14 having an annular air entrance opening 16 and an air exit opening 18 controlled by conventional cowl flaps 20. A combined turbine and fan or turbo-fan 22 is coaxially disposed between the engine and its propeller. The turbo-fan 22 comprises a hub portion 24 having fan blades 26 extending radially therefrom and a rim portion 28 about the outer perimeter of the fan blades having turbine blades 30 extending radially therefrom. Thus the turbo-fan comprises an integral disc-like rotor in which the fan blades 26 simulate the spokes of a wheel. The engine cylinders 32 each exhaust into an exhaust pipe 34 to an individual nozzle box 36 whence the exhaust gases discharge against the turbine blades 30 to drive the turbo-fan 22. When the turbo-fan is driven by the engine exhaust gases, its fan blades 26 supply cooling air from the air entrance 16 to and over the engine cylinders 32 in heat exchange relation therewith and this air then discharges through the air exit opening 18. As is conventional construction, suitable baffles preferably are disposed between the radial cylinders 32 to confine the cooling air flow between the cylinders to the conventional cooling fins 37 projecting therefrom.

The individual nozzle boxes 36 are disposed adjacent each other so that together they define an annular nozzle box construction from which the engine exhaust gases discharge against the turbine blades 30. The turbo-fan and nozzle box construction is hereinafter more fully described. From the turbine blades 30, the exhaust gases enter an annulus 38 whence they discharge rearwardly over the cowl 14. The entrance portion of the cowl is inturned to the leading edge of the turbo-fan inwardly of the turbine blades 30 and a fairing member 40 provides a streamlined continuation thereof to enclose the nozzle box structure. The inturned leading edge of the cowl and the fairing member 40 are both provided with spring loaded clearance type packing 41 cooperable with an annular ring 43, projecting from both sides of the turbo-fan inwardly of the turbine blades 30 to provide a seal therebetween. Also, the hub of the turbo-fan and propeller is enclosed in a fairing structure to provide a streamlined engine nose structure and a streamlined annular air entrance opening 16.

The energy available in the engine exhaust gases in general is much larger than the engine-cooling air power requirements. Thus, the turbo-fan may also be used to pump an air jet out through a discharge orifice controlled by flaps 42 to produce an auxiliary thrust on the aircraft. The opening controlled by flaps 42 is disposed in front of the engine cylinders and therefore the air jet discharging therethrough is in parallelism with the flow of engine cooling air.

In addition, or in lieu of this auxiliary air jet, the extra power available in the engine exhaust gases above the engine cooling air requirements may be also used to drive a supercharger 44. To this end the supercharger 44 is provided with an intake duct 46 and operates to supply compressed air through an intercooler 47 to the carburetor 48 whence the compressed air is discharged either directly to the various engine cylinders or to an engine driven supercharger 49 and thence through the intake pipes 50 to the various engine cylinders. The cooling air for the intercooler 47 may also be supplied through the duct 46 and a duct 46'. In order to drive the supercharger 44, the turbo-fan is drivably connected to a shaft 52 (as hereinafter described) which in turn is drivably connected to a shaft 54 through suitable bevel gears 56 and a universal coupling 58. The shaft 54 is drivably connected to a universal coupling 60 and thence through a suitable multi-speed transmission 62, having a shift control arm 63, to the impeller of the turbo-supercharger 44.

The cooling air power demand on the turbo-fan varies with the rate of flow of the engine cooling air. Thus for a given fan speed, this power demand increases with increase in the rate of flow of the cooling air until a predetermined peak is reached and then decreases with further increase in the rate of cooling air flow. Preferably the turbo-fan is operated beyond this peak, that is, in the range where an increased flow of engine cooling air results in a decreased power demand. Accordingly, the power demand of the engine cooling air can be varied by adjusting the exit cowl flaps 20, thereby controlling the speed of the turbo-fan and therefore the speed and output pressure of the supercharger 44. In addition to or in lieu of this cowl flap control, the pressure of the supercharged air delivered to the carburetor 48 may also be controlled by a waste valve 64.

Figure 1A:
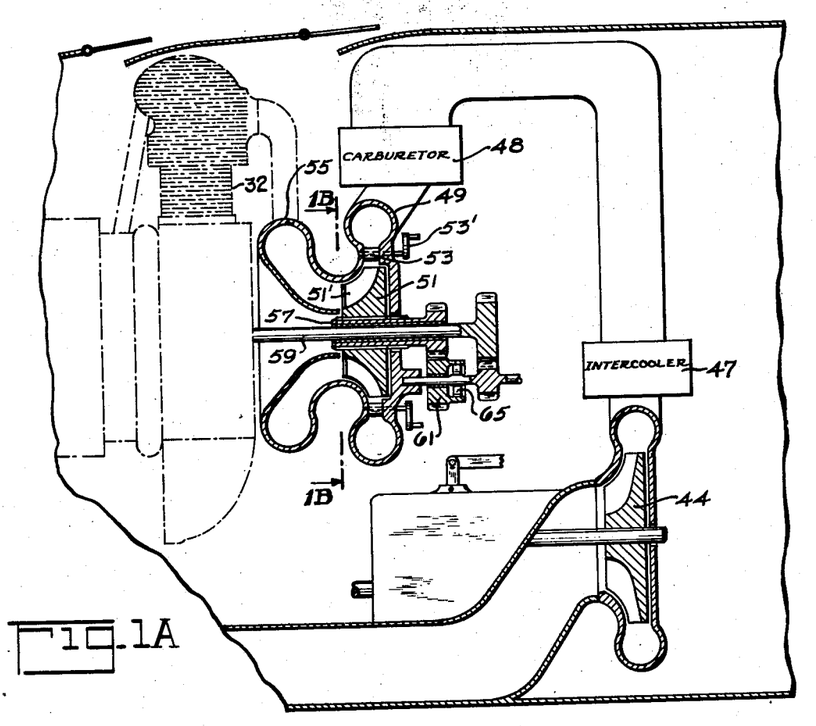
Figure 1A is a schematic view of a modification of Figure 1.
Figure 1B:
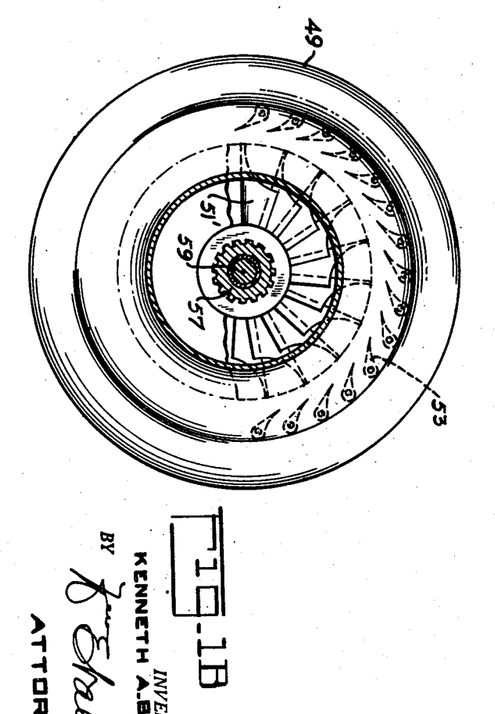
Figure 1B is a view taken along line 1B—1B of Figure 1A.

Figure 1A illustrates a further modification in which the entire output of the turbo-supercharger 44 is used, the supercharger 44 being driven from the turbo-fan 22 as in Figure 1. In general there is sufficient energy available in the engine exhaust gases for the supercharger 44 to over-compress the combustion air or charge. In Figure 1A the entire output of the supercharger passes through the intercooler 47 and the carburetor 48 to an annulus 49 from which it expands through the rotor of a reaction or "Francis" type turbine 51. As is conventional in turbines of this type, the turbine 51 comprises a rotor having a plurality of vanes 51' through which the operating fluid expands and the turbine is regulated by suitable adjustable entrance vanes 53, which, e. g., may be adjusted by crank arms 53'. From the turbine 51 the charge is delivered to an annular manifold 55 whence it is delivered to the various engine cylinders 32. The rotor of turbine 51 is splined to a shaft 57 which is drivably connected to the engine crankshaft extension 59 through suitable gearing 61 including a one-way clutch 65 which overruns if the engine should tend to drive the turbine.

With the arrangement of Figure 1A, the turbine 51 adds some power directly to the engine crankshaft through the gearing 61, but what is more important, the expansion of the charge through the turbine 51 results in an appreciable reduction in temperature of the charge. This reduction in temperature of the engine intake air or charge has several desirable results: (1) increased density of the charge and therefore greater engine power for a given intake manifold pressure; (2) allows engine operation at a higher intake manifold pressure and engine power before detonation occurs; and (3) allows engine operation at a lower fuel-air ratio at a given power without detonation than would be possible at a higher temperature of the engine intake air. Obviously the turbine 51 could be used to drive an engine auxiliary instead of being drivably connected to the engine crankshaft. The essential requirement being that after passing through the intercooler 47 the compressed charge expands through a motor (illustrated as turbine 51) which does work and in so doing extracts heat from the charge.

Figures 2, 3:
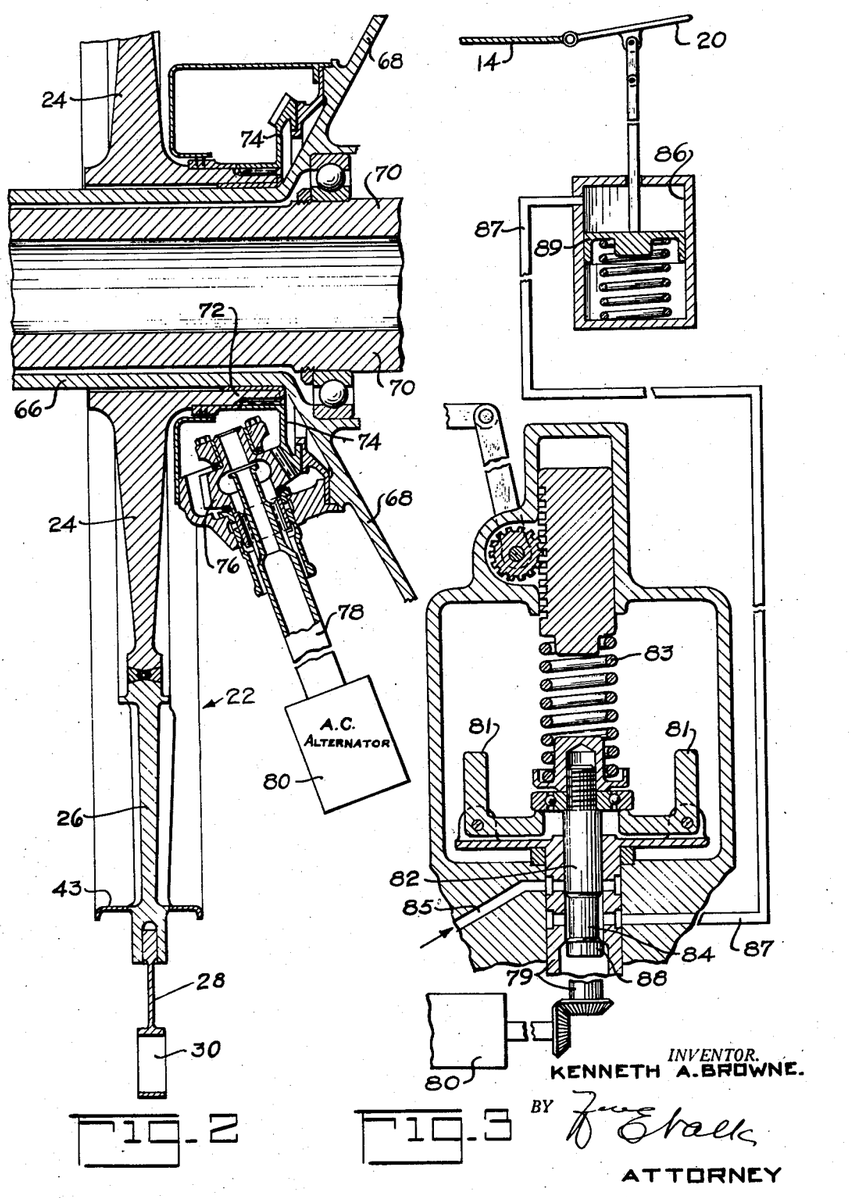
Figure 2 is a sectional view of a modified form of the invention.
Figure 3 is a sectional view illustrating automatic cowl flap control means.

The excess power available in the engine exhaust gases above the engine cooling air power requirements may also be used to drive other engine auxiliaries, e. g., an A. C. alternator. This embodiment of applicant's invention is illustrated in Figure 2 in which the turbo-fan 22 is similar to that illustrated in Figure 1 and as in Figure 1 is journaled about an axial extension 66 of the nose section 68 of the engine crank case. An engine driven propeller shaft 70 is journaled within the crankshaft nose section 68 and extends through the axial extension 66. The turbo-fan hub 24 has an axial extension 72 to which a bevel gear 74 is splined. A second bevel gear 76 is supported from the crank case nose section 68 in driving engagement with the bevel gear 74 and a shaft 78 is splined to the bevel gear 76. With this construction, a portion of the power absorbed by the turbo-fan from the engine exhaust gases supplies the engine cooling air power demand and the balance is transmitted to the shaft 78. In Figure 1 the shaft 52 may have a driving connection to the turbo-fan similar to the driving connection of the shaft 78 in Figure 2.

The shaft 78 is drivably connected to an A. C. alternator 80 which furnishes electric power for the electric equipment of the aircraft or the shaft 78 may be drivably connected to some other engine auxiliary. Preferably the A. C. alternator or other engine auxiliary is driven at a constant speed. To this end and as described in connection with Figure 1, the speed of the turbo-fan and therefore the engine auxiliary driven thereby may be varied by controlling the engine cooling air power demand by means of cowl flaps 20. Thus if the engine cooling air and A. C. alternator power demand on the turbo-fan increases, the turbo-fan speed and therefore the A. C. alternator speed will decrease. However, by adjusting the cowl flaps 20 in the opening direction to decrease the power demand of the engine cooling air, the turbine speed and therefore the A. C. alternator speed may be restored to its desired value. To this end the cowl flaps 20 may be automatically controlled in response to variations in the speed of the A. C. alternator or in response to variations in the frequency of its output current.

Figure 3 illustrates a simple automatic means for adjusting the cowl flaps 20 to maintain the A. C. alternator 80 at constant speed. In Figure 3, a hollow governor shaft 79 is drivably connected to the A. C. alternator 80 and carries flyweights 81 adapted to move outwardly under the action of centrifugal force to raise and lower a valve stem 82 slidably fitted within the hollow shaft 79 against a spring 83. The valve stem 82 is provided with an annular groove 84 which when the valve stem is raised, is adapted to connect a source of engine oil pressure with the cylinder 86 of a hydraulic motor through conduit 87. When the valve stem is lowered to close the oil pressure passage 85, a button 88 at the end of the valve stem moves downwardly into a counterbored portion of the hollow shaft 79 to connect the annular groove 84, conduit 87, and hydraulic motor cylinder 86, to the interior of the hollow shaft 79 to drain oil from the hydraulic motor. The piston 89 of the hydraulic motor is connected to the flaps 20 and is spring urged to effect the opening adjustment of the flaps when oil is drained from the motor cylinder 86 in response to a lowering of the valve stem 82 as a result of a decrease in speed of the A. C. alternator. Upon an increase in speed of the A. C. alternator, the valve stem is raised to admit oil pressure to the hydraulic motor and to close the drain connection to the interior of the shaft 79 whereupon the hydraulic motor operates to effect a closing adjustment of the flaps 20. With this arrangement the cowl flaps 20 are automatically adjusted to vary the engine cooling air power demand on the turbo-fan to maintain a substantially constant speed of the turbo-fan and A. C. alternator driven thereby.

Figures 4, 4A:
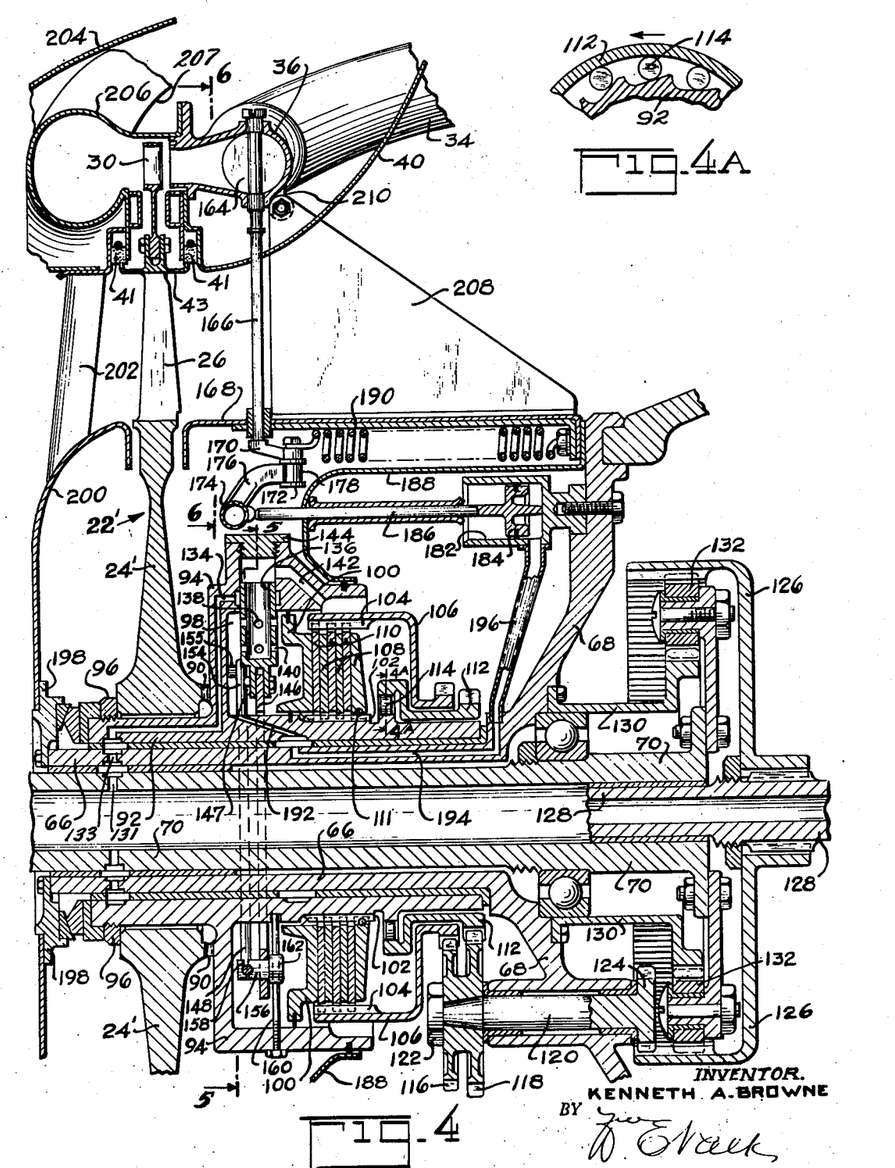
Figure 4 is a sectional view illustrating the preferred form of the invention.
Figure 4A is a sectional view taken along lines 4A—4A of Figure 4.
Figure 5:
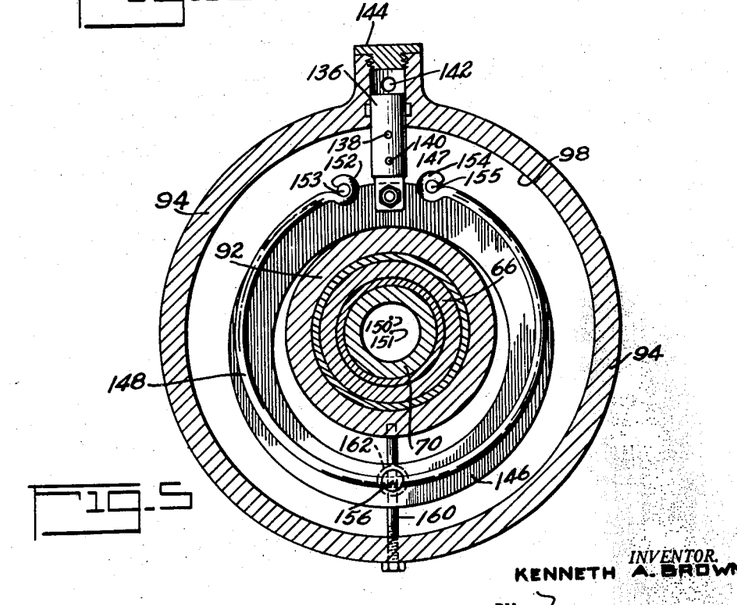
Figures 5 and 6 are sectional views respectively taken along lines 5—5 and 6—6 of Figure 4.
Figure 6:
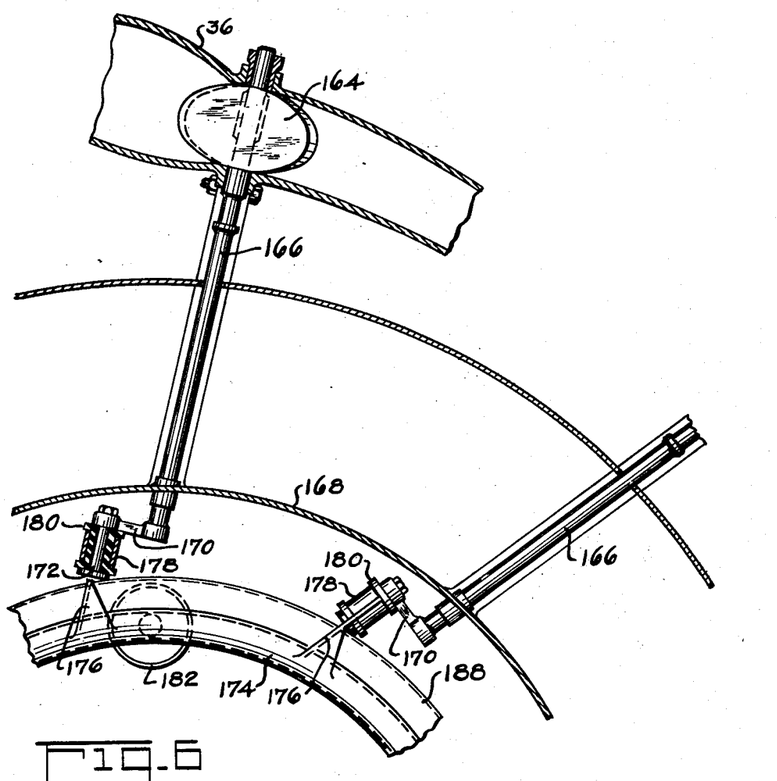

Referring now to Figures 4 to 6, there is disclosed in these figures one embodiment of applicant's invention in which the turbo-fan is drivably connected to the engine crank shaft and propeller shaft in order to use the excess power available in the engine exhaust gases over and above the engine cooling air power requirements. In this embodiment, to two-speed transmission is provided between the turbo-fan and the engine crank shaft in order that the engine speed may be varied through a speed range without forcing a corresponding turbo-fan speed range. The turbo-fan designated 22' in Figure 4 is identical to the turbo-fan 22 of Figures 1 and 2 except its hub 24' has been modified by eliminating the extension 72 and instead providing radially extending splines or serrations 90 about one end of the turbo-fan hub. The turbo-fan hub 24' is loosely fitted over a sleeve 92 of an annular clutch housing 94 and a nut 96 serves to rigidly secure the turbo-fan splines 90 in engagement with corresponding splines on the clutch housing 94. With this radial spline construction, the turbo-fan is accurately piloted regardless of the expansion of its hub 24'. The clutch housing 94 is journaled about the extension 66 of the crank case nose section 68 and is provided with an annular cylindrical space or hydraulic cell 98 within which a piston 100 is slidable. The clutch housing 94 is provided with splines 102 facing splines 104 on an annular gear 106 spaced outwardly therefrom. Between the splines 102 and 104 are disposed a series of clutch plates 108 splined to the clutch housing and an alternate series of clutch plates 110 splined to the annular gear 106. A ring 111 serves to retain the end clutch plate remote from the piston 100 against axial movement. In addition, the clutch housing is connected to a second annular gear 112 through a conventional one-way clutch 114 which is adapted to transmit power from the clutch housing to the gear 112 but not in the reverse direction. The one-way clutch is best seen in Figure 4A in which the arrow indicates the direction of rotation. With this construction the turbo-fan is adapted to be drivably connected to gear 106 or to gear 112, depending on whether the clutch plates 108 and 110 are engaged or disengaged.

A plurality of circumferentially spaced double pinions, comprising gears 116 and 118 are disposed in meshing engagement with annular gears 106 and 112 respectively. Each of the double pinions 116, 118 is secured to a stub shaft 120 by a nut 122. The stub shafts 120 each extend into the crank case nose section 68 which provides a bearing support therefor. The inner end of each stub shaft is provided with a pinion gear 124 disposed in engagement with an internal gear 126 drivably splined to the engine crank shaft 128. A sun gear 130 is secured to the crank case nose section 68 and is spaced radially inward from the internal gear 126. A plurality of circumferentially spaced planet pinions 132 carried by the propeller shaft 70 are disposed between and in meshing engagement with the internal and sun gears 126 and 130 respectively. In this way internal gear 126 is drivably connected to the engine propeller shaft 70 through the planet pinions 132 and is driven by the engine crank shaft 128 and by the stub shafts 120 which in turn are driven by the turbo-fan.

Engagement and disengagement of the clutch plates 108 and 110 is controlled by the admission and venting of oil pressure from the clutch cylinder 98. Engine oil pressure is transmitted to a valve 136, disposed at the outer periphery of the clutch cylinder 98, from the hollow propeller shaft 70 through suitable radial drillings 131 and 133 formed therein and in the axial extension 66 of the crank case nose section to passage 134 which terminates at the valve 136. The valve 136 is automatically moved outwardly to admit oil pressure into the clutch cylinder when the engine speed exceeds a predetermined value, thereby effecting engagement of the clutch plates 108 and 110 to decrease the turbo-fan-to-crankshaft speed ratio and thereby decreasing the speed of the turbo-fan relative to the crank shaft speed. Valve 136 is cup-shaped and comprises two sets of openings 138 and 140. In the position illustrated in Figure 4, the open end of the valve 136 establishes communication through valve openings 140 between the clutch cylinder 98 and a drain passage 142. Therefore, when the valve 136 moves inwardly to the oil pressure closed position, the clutch oil quickly bleeds out through passage 142 under the action of centrifugal force acting on the oil, thereby disengaging the clutch. The oil bleeding out through the passage 142 finds its way back into the engine crank case through suitable openings in the engine nose section 68. When the valve 136 moves outwardly against the stop plug 144 the vent passage 142 is closed thereby and valve openings 138 are aligned with the oil pressure inlet passage 134, whereupon oil pressure is admitted to the interior of the valve 136 and thence into the clutch cylinder 98 through valve openings 140. The clutch piston 100 thereupon operates to engage the clutch plates 108 and 110.

The valve 136 is connected to an annular plate 146 by means of a tongue and groove connection and a bolt 147. The annular valve plate 146 is disposed in the clutch cylinder and is provided with an inner diameter larger than the inner diameter of the clutch cylinder such that the difference in these diameters is substantially equal to the movement of the valve 136. A spring 148 is disposed in the clutch cylinder so as to urge the valve 136 inwardly to its closed position in which the inner diameter of the valve plate 146 abuts against the inner wall of the annular clutch cylinder 98. The plate 146 and valve 136 are so proportioned that when the valve is in its closed position, as illustrated, the center of gravity indicated at 150 in Figure 5 of the combined plate 146 and valve 136 is spaced from the center of rotation 151 of the clutch on the side of the valve 136, whereby the centrifugal force acting on the combined plate and valve urges the valve radially outward to its open position against the force of the spring 148. The function of the spring 148 is to retain the valve 136 in its oil pressure closed position in which the oil pressure is shut off and the clutch is vented until the engine speed exceeds a predetermined value, whereupon the effect of centrifugal force acting on the valve 136 and plate 146 overcomes the valve spring 148 and the valve 136 moves radially outward to its open position.

As best seen in Figure 5 the spring 148 is hoop-like in form and is disposed within the clutch cylinder 98 with its two ends 152 and 154 anchored to the clutch housing on opposite sides of the valve 136 by pins 153 and 155. The midpoint of the spring loop is connected to the valve plate 146 at a point diametrically opposite the valve by means of a stud 156 carried by the plate 146. The stud 156 is provided with a slot 158 for receiving a reduced width portion of the spring loop thereby securing the mid-portion of the spring loop to the valve plate. Thus the stud 156 is not only serving to connect the spring 148 to the valve but it also acts to maintain the symmetry of the spring loop relative to the valve path of travel. A guide pin 160, secured to the clutch housing 94 and extending across the annular clutch cylinder 98, passes through a hole in the head 162 of stud 156 to guide the movements of the valve plate 146 and valve 136 in a radial path.

The spring 148 is so shaped initially that when the valve 136 is in its radially inward or closed position the spring loop is substantially circular about the axis of the clutch housing, and the spring 148 operates to urge the valve radially inward to this closed position. This construction has the advantage over a conventional coil spring acting against the valve in that when the valve is closed and the clutch housing is rotated, the effect of centrifugal force on the spring merely tensions the wire of the spring loop and does not lessen the spring force holding the valve closed. Thus since the mid portion of the spring 148, which is connected to the valve plate 146, is disposed at right angles to the path of valve movement, the tension in the spring loop resulting from centrifugal force acting thereon does not lessen or change the spring force on the valve. However, with a conventional coil spring acting against the valve, the spring would compress under centrifugal force acting on the spring coils themselves. Similarly, a conventional coil spring disposed in the clutch housing with its axis perpendicular to a radial direction and acting on the valve plate 146 to urge the valve 136 in an opening direction, would be impractical since some sort of retaining means would have to be provided to support the spring coils against lateral displacement over the large centrifugal forces acting thereon and in which event the friction between the spring coils and this retaining means as compared to the spring force itself would be excessive, particular at the high rotative speeds contemplated by the present invention.

The spring 148 is also designed so that the increase in the spring return force, urging the valve toward its closed position with radially outward movement of the valve, is less than the resulting increase in the centrifugal force acting on the valve. Therefore, with the speed of the clutch housing increasing, and with the valve in its closed position, as soon as the centrifugal force valve exceeds the spring return force the valve will begin to move outwardly, and, because centrifugal force increases more than the spring return force as a result of this outward valve movement, the valve immediately snaps outwardly to the extreme limit of its travel. Thereupon fluid pressure is admitted to the clutch cylinder 98 to engage the clutch plates 108 and 110 to reduce the turbo-fan to engine-crank-shaft speed ratio, thereby reducing the speed ratio of the drive from the turbo-fan to the crankshaft, e. g., from 3.1 to 1 to 2.3 to 1. At first it might appear that, because of the resulting reduction in the turbo-fan speed, the valve spring would immediately return the valve to its closed position. However, because the centrifugal force on the valve increases more than the spring returned force as a result of outward movement of the valve, if the valve automatically snaps outwardly when the turbo-fan speed exceeds 6,000 R. P. M., the spring would not be able to move the valve inwardly until the turbo-fan speed dropped a predetermined amount below 6,000 R. P. M. For a given spring, the magnitude of this speed differential between the outward and inward valve movements can be increased by providing a larger valve movement and/or by changing the disposition of the mass of the valve 136 and its plate 146 so that their combined center of gravity is moved closer to the axis of rotation. Thus, for the above mentioned speed ratio, the valve 136 may be designed to snap outwardly to effect engagement of the clutch plates 108, 110 when the turbo-fan speed exceeds 6,000 R. P. M. and with the resulting change in speed ratio such as to reduce the turbo-fan speed to 4,500 R. P. M., the valve may be designed so that it does not snap inwardly until the fan speed decreases to 4,000 R. P. M., thereby providing a stable control. At this point it should be noted that with the clutch in its low speed ratio and with the turbo-fan operating between 4,000 and 4,500 R. P. M., the operator can effect a shift to the high ratio by momentarily reducing the engine speed and in this way obtaining a turbo-fan speed approximately between 5,000 and 6,000 R. P. M. Obviously the invention is not limited to these specific valve shifting speeds and speed ratios since the particular speeds at which the valve 136 is designed to shift and the particular speed ratios used obviously depends on the particular installation. At this point it should be noted that with the clutch 108, 110 disengaged, the one way clutch 114 prevents the turbo-fan from absorbing power from the engine, e. g., at engine starting or when the engine is accelerating rapidly.

In the past, and as illustrated in Patents 2,110,711 and 2,348,260, the engagement and disengagement of a rotating clutch was controlled by admitting oil pressure thereto by a remotely disposed valve which obviously could be controlled by a suitable flyweight governor. However, with the prior art construction it was necessary to provide a continuous bleed at the clutch periphery to permit the clutch oil to escape when the oil pressure thereto was cut off, otherwise centrifugal force acting on the oil in the rotating clutch would prevent the clutch from disengaging. Therefore, when such a rotating clutch was engaged, there was a continual circulation of oil through the clutch, and as a result, considerable sludge would accumulate in the clutch. Such accumulation of sludge behind the clutch piston might prevent retraction of the piston. With the present invention, the clutch oil pressure control valve is located at the clutch periphery, and the clutch oil bleeds or drains therefrom only when the oil pressure to the clutch cylinder is cut off. Accordingly, with the present invention, the clutch piston can be tightly sealed within the clutch cylinder, e. g., with rubber seals, and accordingly there is no continual circulation of oil therethrough when the clutch is engaged upon the application of oil pressure thereto. Therefore, the disposition of the clutch control valve 136 as herein described avoids the sludging difficulty encountered in the prior art.

With increasing engine speed, the rate of discharge of engine exhaust gases correspondingly increases, and therefore, to effectively utilize the energy in the exhaust gases, the turbine nozzle area is increased. To this end, valve means are disposed in the annular nozzle box for controlling the effective nozzle area. As previously mentioned, and as hereinafter more fully described, the composite annular nozzle box comprises a plurality of individual nozzle box sections 36, one for each cylinder. Each nozzle box section 36 is provided with a valve 164, controlling its effective nozzle area.

As best seen in Figures 4 and 6, each valve 164 is controlled by a substantially radially supported shaft 166 extending inwardly through an annular fairing member 168 supported from the crank case nose section 68 and extending forwardly to the outer edge of the turbo-fan hub 24'. The inner end of each shaft 166 is provided with a crank arm 170 having a pin 172 carried thereby. An annular member 174 is supported from the various pins 172 by arms 176 each having a boss 178 at one end through which the pins 172 extend. Also, a resilient rubber bushing 180 is disposed between each boss 178 and the pin 172 associated therein and extending therethrough. With this construction, axial movement of the annular member 174 simultaneously adjusts all of the nozzle box valves 164. The rubber bushing 180 permits this valve adjustment even though the ends of the various crank arms necessarily move in an arcuate path.

In order to adjust the valves 164, a plurality of circumferentially spaced piston-cylinder hydraulic motors are supported on the crank case nose section 68. Each of these motors comprises a cylinder 182 and a piston 184 slidable therein and having a piston rod 186 extending through a supporting apron 188 into engagement with the annular member 174. A spring 190 urges the annular member 174 to the right as viewed in Figure 4 to its valve closing position. Accordingly, when fluid pressure is admitted to the cylinder 182 behind the piston 184, the annular member 174 is moved axially forward against the force of springs 190 to open the valves 164. Fluid pressure for actuating the piston 184 is supplied from the clutch cylinder 98 through passage 192 in the clutch housing, passage 194 in the extension 66 of the crank case nose section 68 and thence through conduit 196. With this construction, when oil pressure is admitted to the clutch cylinder 98 through the clutch control valve 136 in response to an increase of the turbo-fan above a predetermined value, oil pressure is simultaneously admitted behind the piston 184 to open the nozzle valves 164 of each nozzle box section, thereby increasing the effective nozzle box discharge area. Similarly, when the turbo-fan speed drops below a predetermined value, and the clutch valve 136 operates to vent the clutch cylinder 98, the various cylinders 182 are simultaneously vented, whereupon the springs 190 operate to close the valves 164 and reduce the size of the nozzle opening.

The turbo-fan and clutch housing 94 are secured against axial movement off the extension 66 of the crank case nose section 68 by a thrust plate 198 secured to the end of the extension 66. In addition, an apron member 200 is supported by the extension 66 to cover the leading end of the turbo-fan hub 24'. Streamlined supporting webs 202 are disposed between the inturned leading edge of the cowl 204 and the apron member 200. The cowl 204 differs from the cowl 14 of Figure 1 in that instead of providing an annular rearwardly directed exhaust exit 38 therethrough for the exhaust gases, the exhaust gases are discharged into an annular collector ring 206 from which they are lead to a suitable discharge opening (not shown). Also as in Figure 1, suitable packing 41 provides a seal around the periphery of the ring 43 on the turbo-fan inwardly of the turbine blades.

Figure 7:
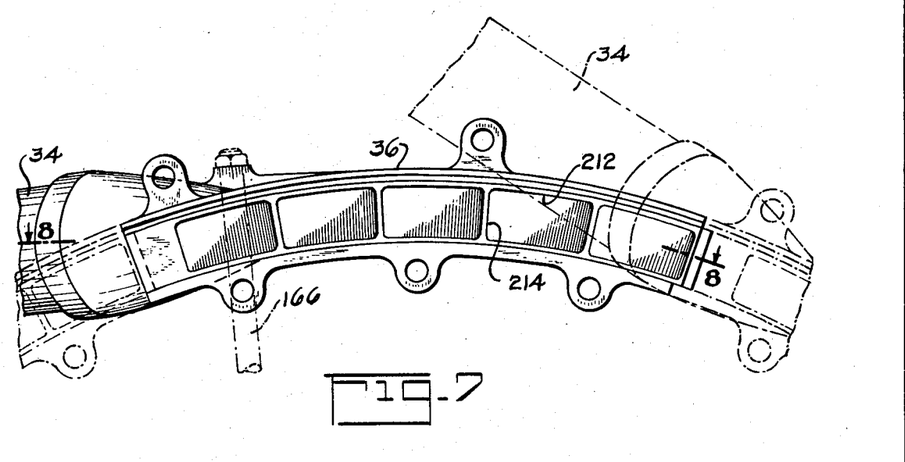
Figure 7 is an end view of the turbine nozzle construction.
Figure 8:
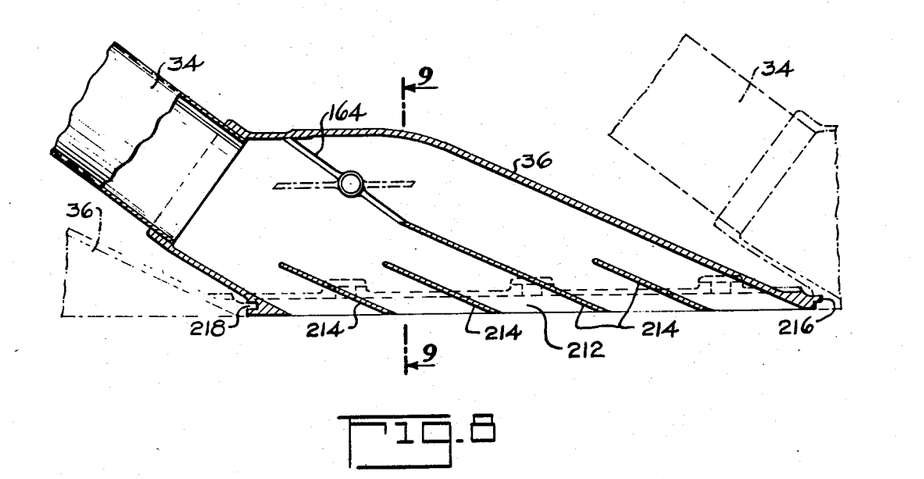
Figure 8 is a sectional view taken along line 8—8 of Figure 7.
Figure 9:
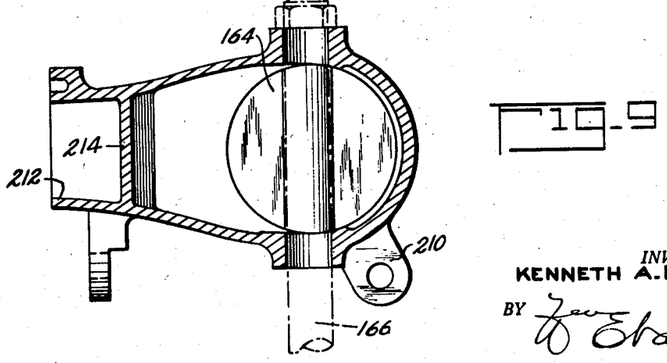
Figure 9 is a sectional view taken along line 9—9 of Figure 8.
Figure 10:
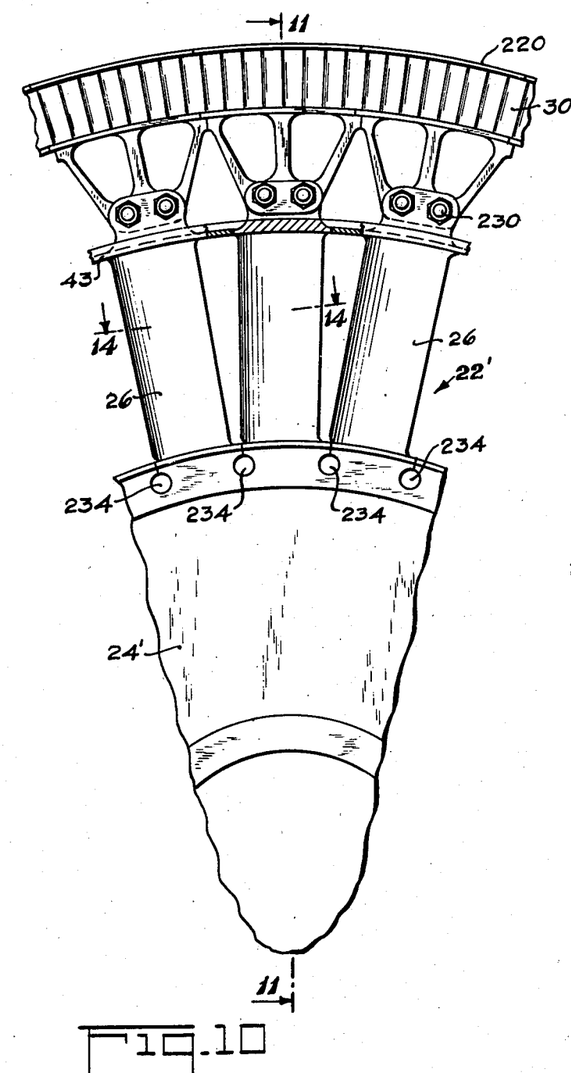
Figure 10 is an end view of a portion of the turbo-fan.

Each individual nozzle box section 36 is supported from the engine crank case nose section 68 by supporting webs 208, each nozzle box section 36 being provided with ears 210 to which the webs 208 are secured. The structure of the various nozzle box sections 36 is best seen in Figures 7, 8 and 9. As illustrated, each nozzle box section 36 comprises a chamber having an arcuate nozzle opening 212 with a plurality of spaced guide vanes 214 that extend thereacross. Each valve member 164 is disposed within the chamber of a nozzle box section 36 and is adapted to extend between one end of the associated nozzle box section and one of the guide ends therein to close off the portion of the nozzle opening 212 therebetween. Upon rotation of the valve 164 to its open position, as illustrated by the dotted lines in Figure 8, the exhaust gases can discharge through the entire nozzle opening 212. Each engine cylinder exhausts into an exhaust pipe 34 which discharges into an individual nozzle box section 36. In this way there is no danger of one cylinder discharging against the back pressure of another cylinder and in addition, the exhaust piping is quite simple and has a minimum volume. Moreover, each of the nozzle box sections 36 has a tongue 216 at one end and a groove 218 at the other end to provide an interlocking connection between adjacent nozzle box sections 36.

The turbo-fan itself is best seen in Figures 10 to 14 which illustrate the turbo-fan 22'. However, turbo-fan 22 is identical except for the structure of its hub 24 which is illustrated in Figure 2. The turbine blades 30 of the turbo-fan are disposed in front of the composite annular nozzle opening, whereby when operating, the hot engine exhaust gases all discharge through the nozzle opening against the turbine blades 30 to drive the turbo-fan. Thus, the outer periphery of the turbo-fan is subjected to a large temperature range between its operating and non-operating conditions. Accordingly, it is desirable to form the turbine blades and outer periphery of the turbine so as to permit circumferential expansion and contraction of the turbine outer periphery without inducing appreciable stresses in the turbo-fan. To this end the turbine blades 30 are formed or cast in integral groups 220 each comprising a plurality of blades 30 and each having a tongue 222 on one end and a groove 224 at the other end to provide a circumferentially slidable interlocking connection between the turbine blade groups. With this construction the individual turbine blade groups 220 are free to expand or contract circumferentially.

Figure 11:
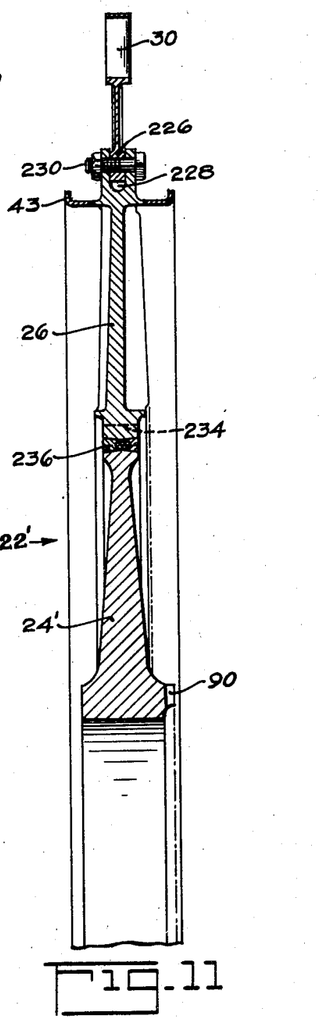
Figure 11 is a sectional view taken along line 11—11 of Figure 10.
Figures 12, 13, 14:
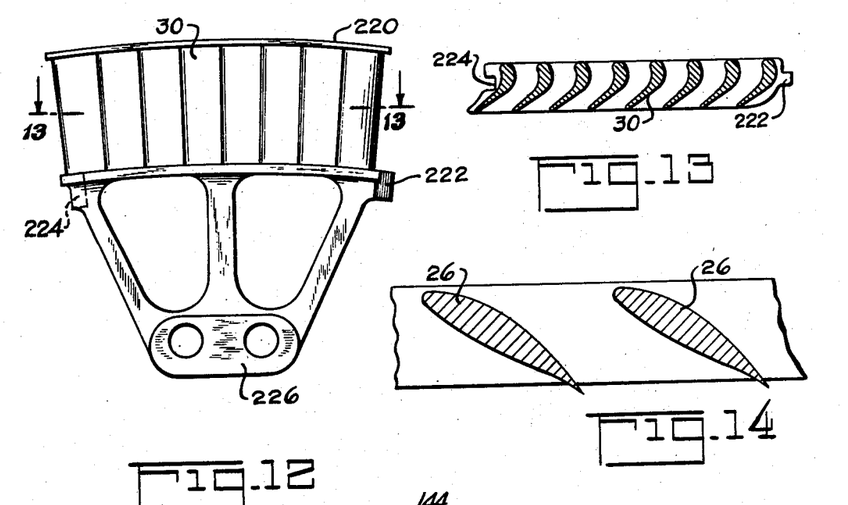
Figure 12 is a detail end view of a turbine blade section.
Figure 13 is a sectional view taken along line 13—13 of Figure 12.
Figure 14 is a section view taken along line 14—14 of Figure 10.

The number of turbine blade groups 220 preferably is equal to the number of fan blades 26 and each turbine blade group is provided with an inwardly directed tongue portion 226 which is adapted to be received within a circumferentially extending groove 228 at the outer end of its associated fan blade 26, and bolts 230 securely fasten these parts together. Each of the fan blades is separately formed or cast and their outer ends extend through an annular ring member 43 which is welded or otherwise secured thereto. The ring 43 is provided with upturned edges for cooperation with the seals 41 of Figures 1 and 4 respectively. The inner or root ends of the fan blades preferably are welded to the turbo-fan hub 24' and holes 234 serve to provide a fillet between the root ends of adjacent fan blades. The cylindrical wall defined by each of holes 234 extends at least to the center of the weld 236, that is, to the inner end of the root ends of the adjacent fan blades and extends outwardly beyond the weld 236, as illustrated in Figure 11. In the absence of holes 234, the weld would extend across the dividing plane between the root ends of adjacent fan blades and as a result cracks would tend to form in the weld in these planes. Also as previously described, the turbo-fan hub 24' is provided with splines or serrations 90 for drivably connecting the turbo-fan to the clutch housing 94. With the aforedescribed construction of the turbo-fan, the fan blades 26 in effect comprises spokes of the turbo-fan wheel 22 or 22' with the turbine blades supported in circumferentially slidable integral groups at the turbo-fan periphery.

At this point it should be noted that although the various embodiments of the invention have been illustrated in connection with a tractor type aircraft propeller installation, it should be obvious that these embodiments can also be applied to a pusher type aircraft propeller installation.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination, an internal combustion engine, a turbine arranged to be driven by the engine exhaust gases, a multi-speed transmission drivably connecting said turbine to said engine, and speed responsive means automatically operative to decrease the turbine to engine speed ratio when the speed of said turbine exceeds a predetermined value.

2. In combination, an internal combustion engine, a crankshaft therefor, an adjustable turbine nozzle through which the engine exhaust gases discharge, a turbine arranged to be driven by said exhaust gases, a multi-speed transmission drivably connecting said turbine to said crankshaft, and speed responsive means automatically operative, when the turbine speed exceeds a predetermined value, to decrease the turbine to crankshaft speed ratio and to increase the effective discharge area of said turbine nozzle.

3. In combination, an internal combustion engine, a crankshaft therefor, engine cooling fan means, an adjustable turbine nozzle through which the turbine exhaust gases discharge, a turbine arranged to be driven by the engine exhaust gases, said turbine being drivably connected to said engine cooling fan means, a multi-speed transmission drivably connecting said turbine to said crankshaft, and speed responsive means automatically operative, when the turbine speed exceeds a predetermined value, to decrease the turbine to crankshaft speed ratio and to increase the effective discharge area of said turbine nozzle.

4. In combination, an internal combustion engine, a crankshaft therefor, an engine cooling fan, a turbine driven by the engine exhaust gases for driving said fan, a multi-speed transmission drivably connecting said turbine to said crankshaft, and means automatically responsive to increase of turbine speed above a predetermined value for shifting said transmission to reduce the turbine to crankshaft speed ratio.

5. In combination, an internal combustion engine, a crankshaft therefor, an engine cooling fan, a turbine arranged to be driven by the engine exhaust gases for driving said fan, and a multi-speed transmission drivably connecting said turbine to said crankshaft, said transmission comprising a one-way clutch adapted to provide a high turbine to crankshaft speed ratio, and a device loadable to provide a low speed ratio drive from said turbine to said crankshaft in parallel to said one-way clutch.

6. In combination, an internal combustion engine, a fan for supplying said engine with cooling air, a turbine driven by the engine exhaust gases for driving said fan, means drivably connecting said turbine to an engine auxiliary, and speed responsive means automatically operative for varying the power required to drive said fan in order to regulate the speed of said turbine and engine auxiliary.

7. In combination: a combustion engine; a turbine arranged to be driven by the engine exhaust gases; a supercharger for supplying the engine with compressed air; means providing a driving connection between said turbine and supercharger; a second turbine arranged to be driven by said air, said second turbine being rotatable independently of said first turbine and supercharger; and means providing a driving connection from said second turbine to said engine, said last-mentioned driving connection including one-way drive means for transmitting torque from said second turbine to the engine but not in the reverse direction.

KENNETH A. BROWNE.

REFERENCES CITED

The following references are of record in the file of this patent:

UNITED STATES PATENTS

| Number | Name | Date |
| --- | --- | --- |
| 1,043,344 | Newman | Nov. 5, 1912 |
| 1,130,444 | Sullivan | Mar. 2, 1915 |
| 1,165,795 | McClave | Dec. 28, 1915 |
| 1,205,016 | Ramsey | Nov. 14, 1916 |
| 1,279,128 | Lake | Sept. 17, 1918 |
| 1,304,928 | Anderson | May 27, 1919 |
| 1,340,229 | Jeffries | May 18, 1920 |
| 1,410,726 | Schoonmaker | Mar. 28, 1922 |
| 1,764,054 | Sautai | June 17, 1930 |
| 1,907,454 | Squires | May 9, 1933 |
| 1,961,905 | Michell | June 5, 1934 |
| 2,050,349 | Lysholm et al. | Aug. 11, 1936 |
| 2,085,604 | Puffer | June 29, 1937 |
| 2,160,281 | Price | May 30, 1939 |
| 2,214,669 | Fedden et al. | Sept. 10, 1940 |
| 2,252,528 | Sikorsky et al. | Aug. 12, 1941 |
| 2,277,839 | Becht | Mar. 31, 1942 |
| 2,278,181 | Lieberherr | Mar. 31, 1942 |
| 2,292,288 | Pateras Pescara | Aug. 4, 1942 |
| 2,348,260 | Moore | May 9, 1944 |
| 2,356,452 | Fedden et al. | Aug. 22, 1944 |
| 2,356,557 | Anxionnaz et al. | Aug. 22, 1944 |
| 2,384,088 | Hagen | Sept. 4, 1945 |
| 2,384,381 | Jocelyn | Sept. 4, 1945 |
| 2,385,366 | Lysholm | Sept. 25, 1945 |
| 2,393,852 | Yingling | Jan. 29, 1946 |

FOREIGN PATENTS

| Number | Country | Date |
| --- | --- | --- |
| 206,845 | Great Britain | Feb. 21, 1924 |
| 601,965 | France | Dec. 16, 1925 |
| 48,251 | France | Aug. 17, 1937 |
| | (Addition to No. 815,881) | |
| 435,928 | Germany | Oct. 20, 1926 |